Figure 1:
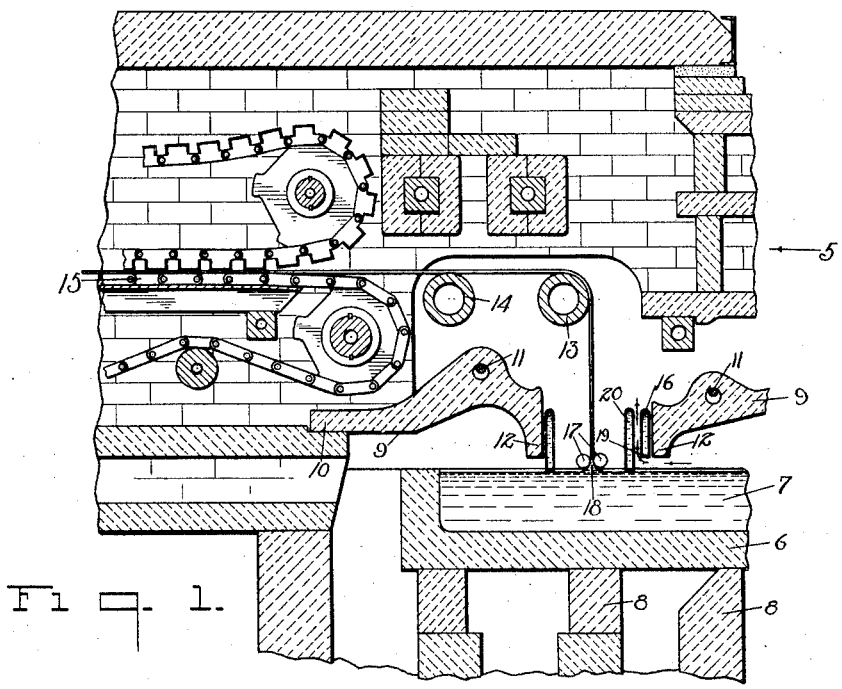

June 19, 1928.

N. MAMBOURG

SHEET DRAWING APPARATUS

Filed Sept. 6, 1924

1,673,916

INVENTOR.
Nestor Mambourg
Frank Glaser
ATTORNEY.

Patented June 19, 1928.

1,673,916

UNITED STATES PATENT OFFICE.

NESTOR MAMBOURG, OF LANCASTER, OHIO, ASSIGNOR TO THE LIBBEY-OWENS SHEET GLASS COMPANY, OF TOLEDO, OHIO, A CORPORATION OF OHIO.

SHEET-DRAWING APPARATUS.

Application filed September 6, 1924. Serial No. 736,250.

This invention relates to improvements in the art of drawing sheet glass, and more particularly to an improved form of cooler or internally cooled shield for use in controlling the temperature of the glass at the sheet source.

In the patent to I. W. Colburn, 1,248,809, granted Dec. 4, 1917, a sheet of glass is drawn upwardly from a shallow pool of molten glass, and in order to control the molten glass at the sheet source and to quickly chill the same to permit a more rapid rate of drawing of the sheet, a pair of water coolers is maintained parallel to and one at each side of the sheet and closely adjacent to the molten glass from which the sheet is drawn. These coolers are rectangular in cross-section with their narrow lower faces positioned as closely as possible to the upper surface of the pool of molten glass and their inner vertical faces arranged parallel to the sides of the sheet and spaced a few inches therefrom. These coolers function to cool the surface glass just prior to its being drawn upwardly into the surface of the sheet, and also function to cool the surface of the drawn sheet and to shield the same from the hot air currents which might otherwise come into contact with the forming sheet.

An object of the invention is to provide means for use in sheet drawing apparatus, adapted to form a flue for removing hot air from near the surface of the glass from which the sheet is drawn.

Another important object of this invention is to provide a new arrangement of cooling means wherein the hot air currents near the surface of the molten glass can more easily be removed, thus increasing the possible speed of the machine and production thereof.

A further object of the invention is to provide a new and improved form of cooler arrangement wherein the sheet being drawn from the pot will be better shielded from the hot air currents passing under the lip-tile, while at the same time a draft will be created to positively remove the hot currents.

A still further object of the invention is to provide a plurality of cooler compartments or tanks near the front of the machine, in spaced relation to each other, so that a flue will practically be formed therebetween to draw the hot air currents, which normally have a tendency to go near the sheet, upwardly and away from the sheet.

Another object of the invention is to provide a plurality of coolers just above the pot so that one of them will be positioned adjacent the front lip-tile with its lower edge substantially flush with the lower edge of the lip-tile, while another cooler will be disposed in spaced relation to the first with an edge disposed just as near the top surface of the glass as possible without touching the same, so that a flue will be formed between the two coolers, while obviously the cooling action of the multiple coolers will be greater than the cooling action of the single coolers heretofore used, thus building up a heavier meniscus with the consequent faster operation of the machine.

Other objects and advantages of the invention will become more apparent from the course of the following description.

In the drawings wherein like numerals are employed to designate like parts throughout the same.

Figure 2:
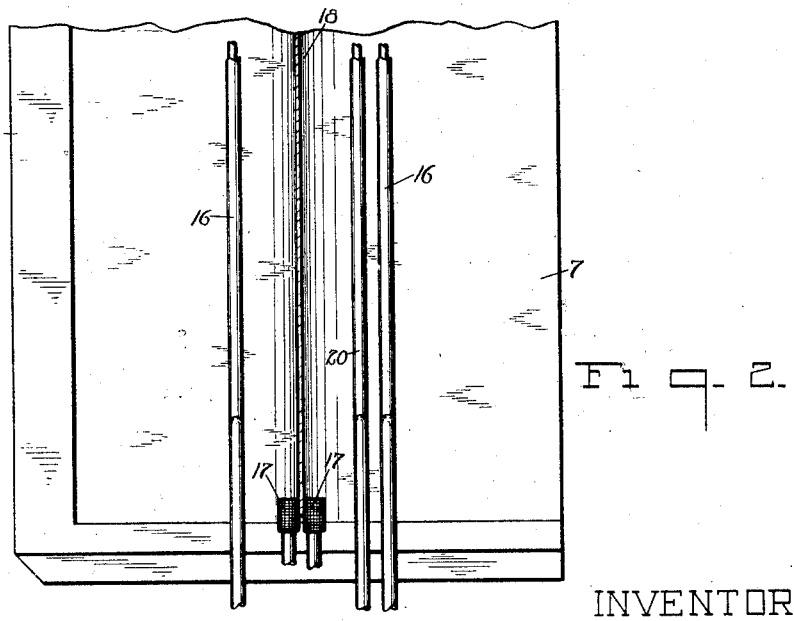

Fig. 1 is a fragmentary longitudinal section taken through the drawing pot and coolers, and Fig. 2 is a fragmentary top plan thereof.

In the drawings wherein for the purposes of illustration is shown the preferred embodiment of the invention, the numeral 5 designates a glass sheet drawing machine in its entirety. The machine 5 includes a pot 6 in which is disposed several inches of molten glass 7. The pot 6 rests upon the supports 8 and is heated by means of suitable burners which are not shown on the drawings.

Arranged above the pot 6 are lip-tiles 9 which are supported as at one end 10 and are hung on suitable pipes or the like 11. The lip-tiles have the downwardly extending lip portions 12 which terminate a substantial distance above the glass level. The glass is drawn out of the pot 6 initially by means of a bait and is pulled up over a bending roll 13, idler roll 14 and a drawing table 15. The apparatus just described is well-known in the art and is disclosed and described to show a form of machine in which the invention can be used.

The glass in the pot 6 as has been pointed out is in a molten state and it must be cooled sufficiently to permit its being drawn upwardly as is shown, and for this purpose coolers 16 are provided. The coolers 16 are hung across the pot to cool the surface glass in the pot so that it can be drawn therefrom and up over the bending roll 13. To guard against narrowing of the sheet as it is being drawn from the pot, knurled rollers 17 are disposed at both edges and on both sides of the sheet just as it is leaving the pot and preferably in the meniscus 18. In accordance with the present invention one of the coolers 16 is mounted so that its lower edge 19 is approximately flush with the lower edge of the lip 12, and preferably very close to the lip-tile, as shown in Fig. 1. A second cooler 20 is mounted in spaced relation to the cooler 16, and is positioned with its lower edge just as near as possible to the surface of the molten glass 7. The function of the lip-tiles 9 is to prevent hot air currents from striking the sheet as it is being drawn from the pot, and to facilitate drawing down of these currents the lip-tiles are curved or arched to direct the air currents toward the pot. However, it will be seen that in the absence of cooler 20, the currents can go under the lip 12 and the cooler 16, and be free to strike the sheet, thus making it impossible to work the machine as fast as desired. With the present arrangement the two coolers 16 and 20 form substantially a flue which creates a draft, causing the hot air to be drawn up as indicated by the arrows in Fig. 1. In this way the hot air currents will be drawn away from the sheet, thus not in any way causing a breakdown of the sheet after it has once left the pot.

In addition to the carrying away of the hot air currents there will be more of a cooling action taking place at the surface of the glass in the pot 6 than heretofore, so that a heavier surface will be built up, thus permitting more glass to be drawn from the pot in a given length of time. It is to be understood that the coolers 16 and 20 are kept cool by a continuous flow of some fluid therethrough, so that the cooling medium does not remain in the coolers a sufficient length of time to heat up.

If it is desired the lip-tiles can be shifted toward or away from the sheet to permit any desired arrangement of the cooling chambers. Ordinarily it will not be necessary to have more than one cooler at the rear of the pot, although the same idea can be employed on both sides of the sheet if the furnace conditions require.

From the foregoing, it will be seen that I have provided a cooler arrangement whereby a draft is created between two coolers arranged in front of the pot so that hot air currents will be drawn away from near the surface of the glass. They will also shield the sheet as it is being drawn from the pot, thus preventing a breakdown of the glass. The cooler nearest the drawn glass will not only act as a shield but will give a greater cooling area in the vicinity of the surface of the molten glass in the pot, which will build up a heavier meniscus, with the result that the speed of the machine can be increased.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A sheet glass drawing apparatus for drawing a sheet from a bath of molten glass including a lip-tile on each side of said sheet, of a pair of coolers arranged between one of the lip-tiles and the sheet, and in spaced relation to each other, one of the coolers being mounted adjacent the lip-tile and having its lower extremity substantially in the longitudinal plane of the lowermost portion of the lip-tile, the other of said coolers being arranged relatively closer to the surface of the molten glass and nearer to the sheet than the first mentioned cooler to form a shield for the sheet as it is drawn, and to cool the surface of the molten glass before it is drawn.

2. In sheet glass apparatus, including a mass of molten glass, means for drawing a sheet therefrom, a lip-tile arranged above the surface of the molten glass, and a pair of members disposed above the molten glass for forming a flue for removing hot air currents from above the pot, the bottom of one of said members being substantially flush with the lower edge of the lip-tile, and the bottom of the other of said members being arranged relatively much closer to the surface of said molten glass.

3. In sheet glass apparatus, including a mass of molten glass, means for drawing a sheet therefrom, a lip-tile arranged above the surface of the molten glass, and a pair of coolers disposed above the molten glass for forming a flue for removing hot air currents from above the pot, the bottom of one of said coolers being substantially flush with the lower edge of the lip-tile, and the bottom of the other of said coolers being arranged relatively much closer to the surface of said molten glass.

4. In sheet glass apparatus, including a mass of molten glass, means for drawing a sheet therefrom, a lip-tile arranged above the surface of the molten glass, and a pair of substantially rectagular shaped coolers disposed above the molten glass for forming a flue for removing hot air currents from above the pot, the bottom of one of said coolers being substantially flush with the lower edge of the lip-tile, and the bottom of the other of said coolers being arranged relatively much closer to the surface of said molten glass.

Signed at Lancaster, in the county of Fairfield, and State of Ohio, this 3d day of September, 1924.

NESTOR MAMBOURG.